US010929736B2

(12) United States Patent
Gac et al.

(10) Patent No.: US 10,929,736 B2
(45) Date of Patent: Feb. 23, 2021

(54) ELECTRONIC DEVICE INCLUDING A COMPONENT POWERED BY INTERNAL ELECTROMAGNETIC COUPLING

(71) Applicant: IDEMIA FRANCE, Courbevoie (FR)

(72) Inventors: Philippe Gac, Courbevoie (FR); Denis Guerard, Courbevoie (FR); Ahmed Ali, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 0 days.

(21) Appl. No.: 16/314,060

(22) PCT Filed: Jun. 28, 2017

(86) PCT No.: PCT/FR2017/051734
§ 371 (c)(1),
(2) Date: Dec. 28, 2018

(87) PCT Pub. No.: WO2018/002526
PCT Pub. Date: Jan. 4, 2018

(65) Prior Publication Data
US 2019/0228279 A1    Jul. 25, 2019

(30) Foreign Application Priority Data
Jun. 29, 2016  (FR) .................................... 16 56132

(51) Int. Cl.
*G06K 19/07* (2006.01)
*G06K 19/06* (2006.01)
*G06Q 20/34* (2012.01)

(52) U.S. Cl.
CPC ... *G06K 19/0718* (2013.01); *G06K 19/06196* (2013.01); *G06K 19/0702* (2013.01); *G06K 19/072* (2013.01); *G06Q 20/341* (2013.01)

(58) Field of Classification Search
CPC ......... G06K 19/0718; G06K 19/06196; G06K 19/0702; G06K 19/072; G06Q 20/341
See application file for complete search history.

(56) References Cited

U.S. PATENT DOCUMENTS 6,128,604 A * 10/2000 Sakamaki ............ G06K 7/0013
705/41
10,089,568 B2 * 10/2018 Mosteller ........... G06K 7/10297
(Continued)

FOREIGN PATENT DOCUMENTS

EP          1 895 448 A1    3/2008
WO          02/01496 A1     1/2002
(Continued)

OTHER PUBLICATIONS

International Search Report, dated Nov. 2, 2017, from corresponding PCT/FR2017/051734 application.

*Primary Examiner* — Stephen G Sherman
(74) *Attorney, Agent, or Firm* — Nixon & Vanderhye

(57) ABSTRACT

Disclosed is an electronic device including: a body; a module enclosed in the body; a microcircuit and a direct current source, both forming part of the body; and an electronic component forming part of the module and accessible from the exterior, the electronic component being electrically connected to the microcircuit and having to be supplied with direct current from the direct current source. The body includes a first antenna connected to the direct current source via an oscillator and the module includes a second antenna connected to the electronic component via a rectifier circuit, the first and second antennas being electromagnetically coupled, providing a wireless radio frequency power supply to the electronic component of the module from the direct current source of the body.

19 Claims, 4 Drawing Sheets

(56) References Cited

U.S. PATENT DOCUMENTS

| | | | |
|---|---|---|---|
| 2005/0097038 A1* | 5/2005 | Yu | G06Q 20/045 |
| | | | 705/40 |
| 2008/0016004 A1* | 1/2008 | Kurasaki | G06Q 20/04 |
| | | | 705/67 |
| 2008/0156885 A1* | 7/2008 | Landau | G06K 19/0702 |
| | | | 235/492 |
| 2011/0037322 A1* | 2/2011 | Kanno | H02J 7/025 |
| | | | 307/104 |
| 2014/0052630 A1 | 2/2014 | Bona et al. | |
| 2015/0178718 A1* | 6/2015 | Liu | G07F 7/125 |
| | | | 705/67 |

FOREIGN PATENT DOCUMENTS

| | | |
|---|---|---|
| WO | 02/01497 A1 | 1/2002 |
| WO | 2015/015121 A1 | 2/2015 |

* cited by examiner

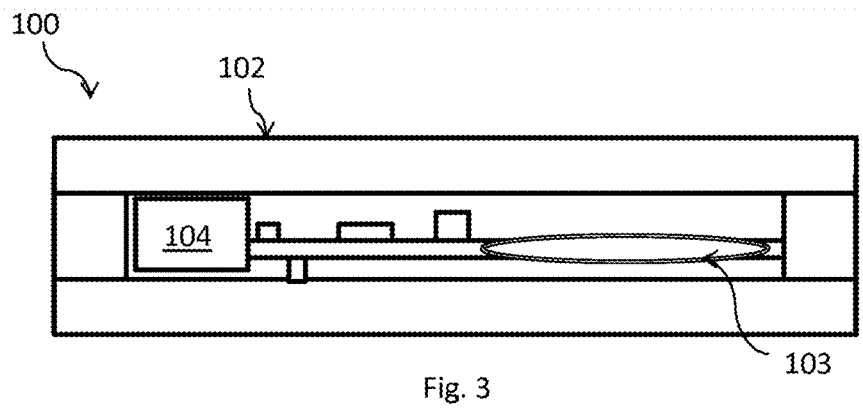
Fig. 3
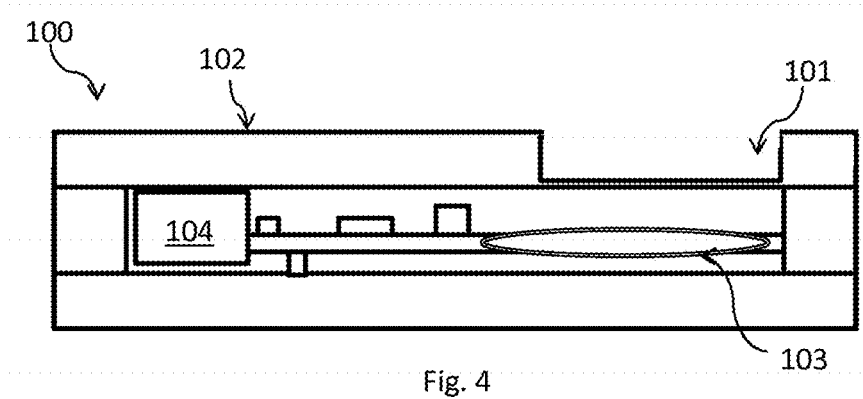
Fig. 4
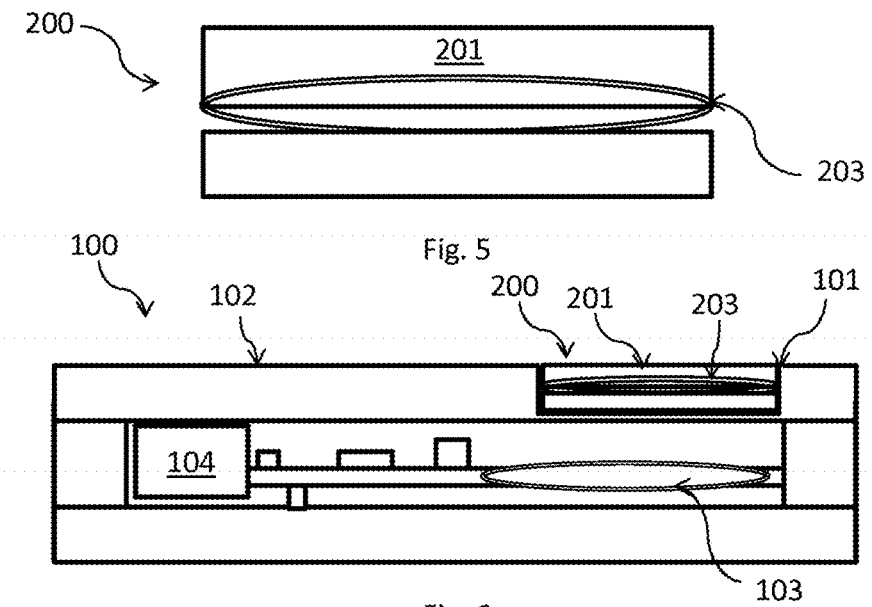
Fig. 5
Fig. 6

ELECTRONIC DEVICE INCLUDING A COMPONENT POWERED BY INTERNAL ELECTROMAGNETIC COUPLING

BACKGROUND OF THE INVENTION

Field of the Invention

The present invention relates to an electronic entity, of the type comprising a microcircuit and at least one electronic component powered by direct current.

Description of the Related Art

There is a type of electronic entity which primarily comprises a body and a module inserted into this body by occupying a cavity formed in the body.

Such a type of electronic entity is in particular known in which the electronic component forms part of the module.

Now, when the electronic component comprises many connections (typically between 10 and 20 terminals), it is then difficult to connect it to the microcircuit positioned in the body, in particular because a flatness of the connections is difficult to ensure when inserting the module into the body.

For some types of electronic entities, it is necessary for the electronic component to be located on the surface of the electronic entity, that is to say for it to be flush with a face, also called top face, of the body.

Such an electronic entity is for example a so-called "biometric" card, with a fingerprint sensor. A microcircuit which collects the data and which processes them is then located inside the body of the card.

To obtain such a card, the sensor is possibly added right at the end of fabrication to the body of the card by insertion, for example by simple bonding via an anisotropic adhesive.

However, the connection via an anisotropic adhesive usually requires thick objects, which is not the case with the components and the printed circuits in such a case.

The assembly is therefore not generally satisfactory.

BRIEF SUMMARY OF THE INVENTION

At least one of the objectives of the present application is thus to at least partly resolve the abovementioned drawbacks, while also providing other advantages.

It aims in particular to propose an electronic entity in which a direct current electronic component is easily incorporated, notably in order to be connected to a direct current source situated in the body.

To this end, there is proposed, according to a first aspect, an electronic entity comprising:
 a body in which there is formed a cavity emerging on one face of this body, said face of the body forming a face of the entity,
 a module inserted into this body by occupying said cavity,
 a microcircuit forming part of this body,
 a direct current source forming part of this body, and
 an electronic component forming part of the module and accessible from the outside through said face of the entity, this electronic component being connected electrically to the microcircuit and having to be supplied with direct current by the direct current source,
characterized in that the body comprises a first antenna connected to the direct current source through an oscillator and in that the module also comprises a second antenna connected to this electronic component through a rectifier circuit, this first antenna and this second antenna being electromagnetically coupled, ensuring a wireless radiofrequency powering of the electronic component of the module by the direct current source of the body.

Thus, physical means for connecting the electronic component, which connect the electronic component to the microcircuit, are transferred into the module instead of being at the interface between the module and the body.

An oscillator here denotes an electronic element, or a set of electronic elements, configured to transform a direct signal into an alternating signal at a given frequency.

A rectifier circuit here denotes an electronic element, or a set of electronic elements, configured to rectify an alternating signal into a direct signal and, optionally, keep it at a certain level, that is to say at a predetermined level. To this end, the rectifier circuit possibly comprises, for example, a regulator.

The document WO 2015/015121 was known. However, this document is limited to the case of a coupling between a microcircuit borne by a module and an antenna formed in the body in which this module is inserted, which corresponds to a particularly simple circuit involving only alternating currents.

Such a coupling seemed impossible to transpose and in any case incompatible with an electronic component requiring a direct current power supply.

However, contrary to the preconceptions, it has been proved in reality that it was possible to incorporate a direct current component into a module because it is in fact perfectly feasible and easy to add an oscillator between the first antenna and the direct current source in the body and to add a rectifier circuit between the second antenna and the electronic component in the module thanks to the current miniaturization possibilities.

In an electronic entity according to the invention, it is then possible to easily have an electronic component positioned in a module, requiring a direct current power supply, communicate with a direct current source and a microcircuit contained in the body of the electronic entity, without physical contact between the module and the body, by virtue of a double-antenna system.

Since the mechanical contacts between the electronic component and a printed circuit are then transferred into the module which is then inserted, the connection problem is then managed separately from the insertion, which then renders the insertion easy to perform.

The module comprises, for example, an intermediate support which comprises the second antenna and the rectifier circuit and to which the electronic component is connected.

For example, the coupling between the first antenna and the second antenna is configured to transmit at least 90% of the power transmitted by the direct current source.

According to an exemplary embodiment, the module comprises a printed circuit connected on the one hand to the second antenna and on the other hand to the electronic component by a plurality of terminals, the number of which is greater than or equal to 4.

In fact, it is necessary to have a minimum number of connection terminals corresponding to the number of signals to be transmitted. For example, it may involve a so-called "input" signal and/or a so-called "output" signal and/or a "chip select" signal for activating a chip and/or a clock signal and/or a ground and/or at least one power supply signal.

In an exemplary embodiment, the electronic entity also comprises a modulator connected to one of the first antenna or the second antenna and a demodulator connected to the other of the first antenna or the second antenna, the first antenna and second antenna being thus configured to also ensure a transmission of signals between the electronic component and the microcircuit.

The first and second antennas are thus configured to adapt the electronic component and the microcircuit to a transmission of signals by electromagnetic coupling, thus optimizing such an arrangement of the electronic entity.

The electronic component is for example a display or a sensor. Thus, in addition to the energy received in one direction, the electronic component can transmit or receive signals.

In an interesting exemplary embodiment, the electronic component is a sensor generating signals intended for the microcircuit, the modulator being connected between the electronic component and the second antenna in the module and the demodulator is connected between the first antenna and the microcircuit in the body such that the first and second antennas ensure a transmission of said signals from the electronic component to the microcircuit.

For example, the electronic component is a fingerprint sensor.

Such a fingerprint sensor is also possibly called biometric sensor.

In an interesting exemplary embodiment, the module comprises a parallel-serial converter between the electronic component and the second antenna configured to at least transmit signals in series.

In fact, at the output of the electronic component, the information can be sent in parallel or in series. Now, an antenna can transmit information only in series. If the electronic component is optimized to send signals in parallel, for example signals intended for a component in the body of the electronic entity, it is then necessary to have such a parallel-serial converter, in particular in the module.

According to a particularly convenient exemplary embodiment, the direct current source is a battery.

Battery is understood here to mean any constant source of energy, any reserve of energy or even any energy storage means; it is for example an accumulator or a cell.

According to another particularly convenient exemplary embodiment, the direct current source possibly comprises at least one photovoltaic cell.

For example, and in particular if the direct current source is a battery, the direct current source is connected to the electronic component through a switch allowing a user of the electronic entity to connect this direct current source to the electronic component, or to disconnect it, at will.

The presence of a switch notably makes it possible to avoid accidental discharging of the direct current source.

In an exemplary embodiment, the switch is a pushbutton, the depression of which connects the direct current source to the electronic component.

In another exemplary embodiment, the switch is controlled by a transducer capable of generating a current by conversion of an energy coming from outside.

As an example, the transducer can be a piezoelectric element which converts an external mechanical energy into electrical energy, or a photovoltaic solar sensor which converts a light energy, in particular solar, into electrical energy.

In a particular embodiment, said transducer is borne by a second module inserted into a second cavity of the body, the second module also comprising a second additional antenna powered by the transducer and the body comprising a first additional antenna connected to the switch, the first additional antenna being coupled electromagnetically to said second additional antenna.

In yet another exemplary embodiment, the switch is controlled by an antenna configured to connect the direct current source to the electronic component when this antenna enters into a surrounding electromagnetic field.

In a particular exemplary embodiment, the body comprises an antenna connected to the microcircuit, said antenna being configured to allow the microcircuit to communicate with an external reader.

In addition, the body also possibly comprises a chip. In particular, the chip can be positioned between the microcircuit and the antenna for communication with an external reader.

For example, the body is delimited by said face and an opposite face, which are both planar, the separation between these planar faces defining a thickness of this electronic entity.

Out of a thickness, a width and a length representing the dimensions of the electronic entity, the thickness here denotes the smallest dimension.

The electronic entity is for example a passport or a card, for example a card conforming to the current standards, in particular ISO 7810 and ISO 7816, for example a card of ID-1 format (85.60 mm*53.98 mm*0.76 mm), but it can also concern other formats depending on the needs.

Also proposed, according to a second aspect, is a method for fabricating an electronic entity comprising all or some of the features presented previously, the method comprising:
- a step of formation of a body containing a microcircuit and a direct current source and a first antenna connected to the direct current source through an oscillator, this body comprising a cavity emerging on one face of the body, said face of the body forming a face of the entity, the cavity having the form and the volume of a module;
- a step of formation of the module containing an electronic component and a second antenna connected to this electronic component through a rectifier circuit;
- a step of insertion of the module into the cavity of the body, the electronic component being accessible from the outside through said face of the entity, the first antenna and the second antenna being electromagnetically coupled, ensuring a wireless radiofrequency powering of the electronic component by the direct current source and electrically connecting this electronic component to the microcircuit.

Such a method thus presents advantages similar to those stated in conjunction with the electronic entity described previously.

In particular, since the mechanical contacts between the electronic component and the printed circuit are then transferred into the module which is then inserted, the connection problem is then managed separately from the insertion, which then renders the insertion easy to perform.

BRIEF DESCRIPTION OF THE DRAWINGS

The invention, according to an exemplary embodiment, will be well understood and its advantages will become more apparent on reading the following detailed description, given in an indicative and nonlimiting manner, with reference to the attached drawings in which:

FIG. 4 shows the body of FIG. 2 in which a cavity has been formed to place a module therein, FIG. 5 schematically presents, in cross section, an exemplary embodiment of a module of an electronic entity according to an exemplary embodiment of the present invention, FIG. 6 represents the body of FIG. 4 in which the module of FIG. 5 has been inserted, and FIG. 7 schematically presents, in plan view, an electronic entity according to an exemplary embodiment of the present invention.

DETAILED DESCRIPTION OF THE PREFERRED EMBODIMENTS

The identical elements represented in the abovementioned figures are identified by identical numeric references.

Figure 1:
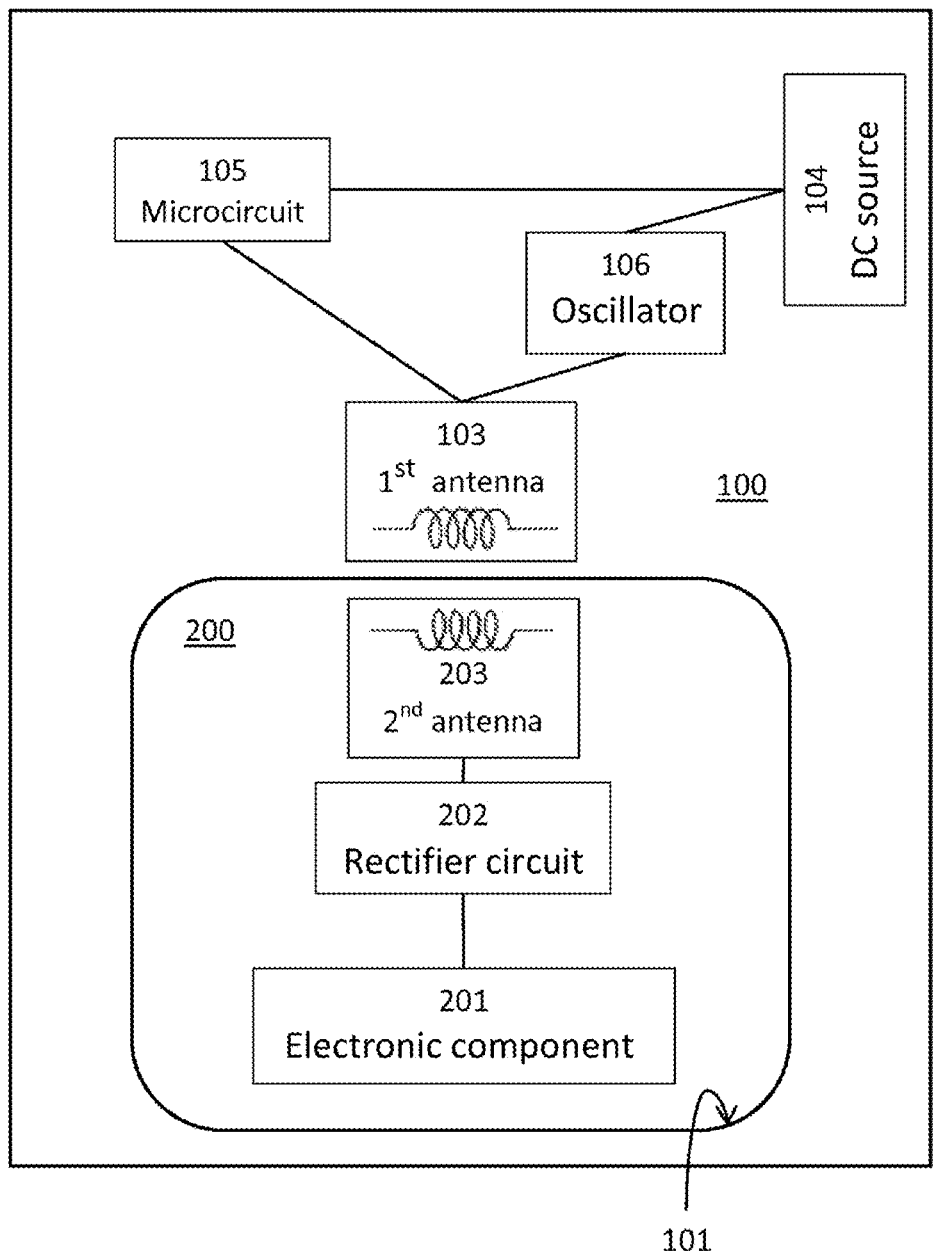
FIG. 1 represents a diagram of an exemplary embodiment of an electronic setup of an electronic entity according to an exemplary embodiment of the present invention.

FIG. 1 schematically represents an electronic entity according to an exemplary embodiment of the invention.

The electronic entity is for example a passport or a card, for example a card conforming to the current standards, in particular ISO 7810 and ISO 7816, for example a card of ID-1 format (85.60 mm*53.98 mm*0.76 mm), but it can also concern other formats depending on the needs.

The electronic entity primarily comprises a body 100 and a module 200.

The body 100 comprises in particular a cavity 101 and a top face 102.

For example, the body is delimited by said face 102 and an opposite face, which are both planar, the separation between these planar faces defining a thickness of this electronic entity, it being understood that, out of a thickness, a width and a length representing the dimensions of the electronic entity, the thickness here denotes the smallest dimension.

The cavity 101 is formed in the body 100 so as to emerge on the face 102 of this body, said face 102 of the body forming a face of the electronic entity.

The body also comprises an electronic circuit, detailed hereinbelow.

When the electronic entity is a card, for example a chip card, the body 100 traditionally comprises several layers, generally made of plastic. In this case, the electronic circuit is generally placed between the plastic layers. This is for example illustrated in FIGS. 3, 4 and 6.

The body, in particular the electronic circuit, here comprises a direct current source 104 and a microcircuit 105, and according to the invention, the body 100 also comprises a first antenna 103, linked to the microcircuit 105, and an oscillator 106 also connecting the first antenna 103 to the direct current source 104.

The module 200 is inserted into the body 100 by occupying said cavity 101.

The module 200 comprises an electronic component 201 and a second antenna 203.

In particular, the electronic component 201 is accessible from the outside through said face of the entity 102, as FIG. 6 illustrates for example.

The electronic component 201 is electrically connected to the microcircuit 105 and, in operation, is powered with direct current by the direct current source 104.

For that, the second antenna 203 is connected to the electronic component 201 through a rectifier circuit 202.

In practice, it can be a regulator; to the rectifying function there are often added a clamping function and a stabilization function.

The first antenna 103 and the second antenna 203 are then electromagnetically coupled, thus ensuring a wireless radiofrequency powering of the electronic component 201 of the module 200 by the direct current source 104 of the body 100.

The coupling between the first antenna and the second antenna makes it possible to dispense with a physical connection that is difficult to control.

In fact, for such a connection, it is traditionally necessary to connect all the contact terminals of the electronic component facing an element, called "flex", traditionally embedded in the body and comprising corresponding contact pads, which must also be totally planar, which is difficult in light of the various steps of fabrication of an electronic entity. Furthermore, the pads, generally made of copper, have a thickness of the order of twenty or so micrometers, which represents approximately a fifth of the thickness of the flex. There is therefore a consequential risk of tearing of the flex in the machining of the pads which is therefore relatively significant.

According to the invention, the physical connection means of the electronic component, which connect the electronic component to the microcircuit, are transferred into the module instead of being at the interface between the module and the body. Since the mechanical contacts between the electronic component and a printed circuit are then transferred into the module which is then inserted, the connection problem is then managed separately from the insertion, which then renders the insertion easy to perform. In addition, that offers the advantage of having the connection means inside the module. They are thus protected from deliberate degradations (due to a malicious action) or accidental degradations (due to unfavorable humidity and temperature conditions) which could be applied to the electronic entity.

The production of an antenna with small dimensions is in fact perfectly possible to consider with the current technologies.

The coupling between the two antennas is easily achieved because the two antennas are fixed relative to one another, facing one another.

Furthermore, they are preferably of the same sizes and as close as possible to one another. In addition, the modulation of the signal allows for an optimization of transfer of the data from the electronic component to the microcircuit in the card body.

For example, the coupling between the first antenna 103 and the second antenna 203 is configured to transmit at least 90% of the power transmitted by the direct current source 104.

This module 200 then possibly has no power supply and no ground.

The module comprises, for example, an intermediate support (not represented) which comprises the second antenna 203 and the rectifier circuit 202 and to which the electronic component 201 is connected.

The electronic component 201 is possibly of different types. In particular, it can be a display or a sensor. Thus, in addition to the energy received in one direction, the electronic component can transmit or receive signals.

Figure 2:
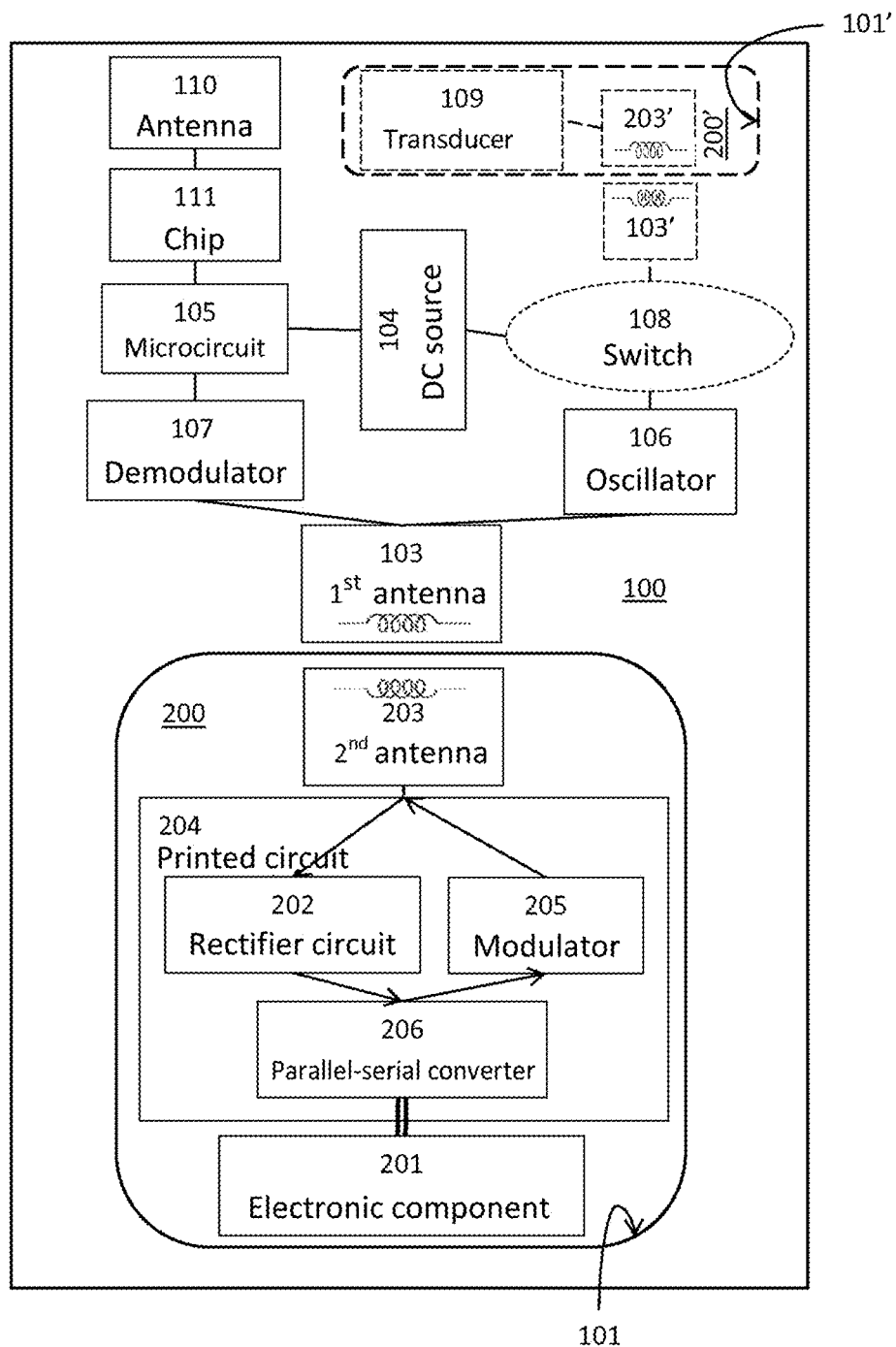
FIG. 2 represents a diagram of another exemplary embodiment of an electronic setup of an electronic entity according to another exemplary embodiment of the present invention, FIG. 3 schematically presents, in cross section, an exemplary embodiment of a body of an electronic entity according to an exemplary embodiment of the present invention.

FIG. 2 presents an exemplary embodiment of the present invention in which several options have been combined.

In the present exemplary embodiment, the electronic component 201 is for example a sensor, in particular a fingerprint sensor. The electronic component then generates signals intended for the microcircuit 105.

For example, the electronic entity comprises a modulator 205 and a demodulator 107.

The modulator 205 is then connected between the electronic component 201 and the second antenna 203 in the module 200 and the demodulator 107 is then connected between the first antenna 103 and the microcircuit 105 in the body 100.

The first antenna 103 and the second antenna 203 are thus configured to also ensure a transmission of said signals from the electronic component 201 to the microcircuit 105.

The module also possibly comprises a parallel-serial converter 206, positioned between the electronic component 201 and the second antenna 203. The parallel-serial converter 206 is then configured to convert the information sent in parallel at the output of the electronic component 201 into serial information that can be transmitted by the second antenna 203.

Here, the module 200 also comprises a printed circuit 204 which is connected on the one hand to the second antenna 203 and on the other hand to the electronic component 201 by at least four terminals. In fact, it is necessary to have a minimum number of connection terminals corresponding to the number of signals to be transmitted. For example, it may involve a so-called "input" signal and/or a so-called "output" signal and/or a "chip select" signal for activating a chip (if necessary) and/or a clock signal and/or a ground and/or at least one power supply signal.

Depending on the type of sensor, the printed circuit 204 is then configured to adapt the signal from the electronic component 201 to a wireless radiofrequency transmission.

In the present exemplary embodiment, the printed circuit 204 then comprises the rectifier circuit 202, the modulator 205 and the parallel-serial converter 206.

In fact, for example, on the one hand, the electronic component 201 receives a power supply signal from the direct current source 104 via the second antenna 203: this signal is processed and rectified. On the other hand, the electronic component 201 can send a modulated signal, for example deriving from a fingerprint sensor forming the electronic component 201.

The first antenna 103 and the second antenna 203, that are coupled, then form a wireless communication interface between the fingerprint sensor and the microcircuit 105 to transmit data relating to the fingerprints acquired by the sensor.

In other words, in reception, a signal arrives via the second antenna 203, is rectified by the rectifier/regulator circuit 202 and addressed to the corresponding terminal of the electronic component, through, if necessary, the serial-parallel converter. In transmission, signals from the electronic component 201, in the case of parallel transmission, are converted into serial signals by the parallel-serial converter 206 then modulated by the modulator 205 and transmitted, out of the module 200, by the antenna 203.

In the body 100, the first antenna 103 is thus linked on the one hand to the oscillator 106, which is itself linked to the direct current source 104, and on the other hand to the demodulator 107, which is itself linked to the microcircuit 105.

In the present exemplary embodiment, the direct current source 104 is a battery.

Furthermore, the body 100 also here comprises a switch 108.

In this exemplary embodiment, the switch 108 is positioned between the direct current source 104 and the oscillator 106.

The presence of a switch notably allows a user of the electronic entity to connect the direct current source 104 to the electronic component 201, or to disconnect it, at will.

Here, the body 100 comprises a second cavity 101' and a second module 200' which is inserted into the second cavity 101'.

The second module 200' comprises a transducer 109. In operation, the transducer generates a current by conversion of an energy coming from the outside. As an example, the transducer can be a piezoelectric element which converts external mechanical energy into electrical energy, or a photovoltaic solar sensor which converts a light energy, in particular solar, into electrical energy.

The transducer is configured to control the switch 108.

To this end, the second module 200' comprises a second additional antenna 203', which is then powered by the transducer 109, and the body comprises a first additional antenna 103' which is connected to the switch 108.

The first additional antenna 103' is then coupled electromagnetically to said second additional antenna 203'.

According to another example not represented, the switch is a pushbutton and, in this case, the electronic entity possibly has no first additional antenna, no second cavity and no second module, that is to say possibly it has no transducer and no second additional antenna.

In yet another example not represented, the body comprises another antenna which is configured to control the switch to connect the direct current source to the electronic component when this antenna enters into a surrounding electromagnetic field. In this case, the electronic entity possibly also has no first additional antenna, no second cavity and no second module, that is to say possibly has no transducer and no second additional antenna.

In the present exemplary embodiment, the body also comprises an antenna 110 connected to the microcircuit. The antenna 110, called antenna 110 for communication with an external reader, is configured to allow the microcircuit 105 to communicate with an external reader.

Finally, the body comprises, for example, a chip 111. In particular, the chip 111 is arranged between the microcircuit 105 and the antenna 110.

FIGS. 3 to 6 schematically illustrate a method for fabricating an electronic entity according to an exemplary embodiment of the invention. It involves, for example, on the one hand producing the body of the electronic entity.

As FIG. 3 shows, all of the electronic circuits, for example the direct current source 104, the first antenna 103, a microcircuit, an oscillator, etc., is embedded in the body. If the electronic entity is a card, the electronic circuit is for example introduced between layers forming the body.

FIG. 4 represents a step of formation of the cavity 101. The cavity 101 is dimensioned to have the form and the volume of the module 200 intended to be inserted therein.

It involves, for example, a milling step performed over a part of the body, starting from the face 102 in order to form the cavity 101, emerging on a face 102 of the body.

FIG. 5 represents schematic a step of formation of the module 200. The module 200 contains the electronic component 201 and the second antenna 203 connected to this electronic component 201 through a rectifier circuit.

For example, the step of formation of the module comprises a step of formation of an intermediate support which comprises the second antenna 203 and the rectifier circuit then a step of connection of the electronic component 201 to the intermediate support.

Finally, FIG. 6 represents a step of insertion of the module 200 into the body 100, in particular into the cavity 101 of the body 100, with the electronic component 201 accessible from the outside through said face 102.

The insertion can be done hot or cold.

It can then be performed by bonding, for example via an adhesive, for example PSA (pressure-sensitive adhesive) or "hotmelt".

The method also comprises, for example, a step of electromagnetic coupling of the first antenna 103 and of the second antenna 203 in order to ensure a wireless radiofrequency powering of the electronic component 201 by the direct current source 104 and of electrically connecting the electronic component 201 to the microcircuit 105.

The tuning of the two antennas relative to one another thus allows for an exchange of data if appropriate.

If the electronic entity comprises another cavity and a second module, the method comprises similar steps for forming the other cavity and inserting the second module. The second module is produced accordingly.

Figure 7:
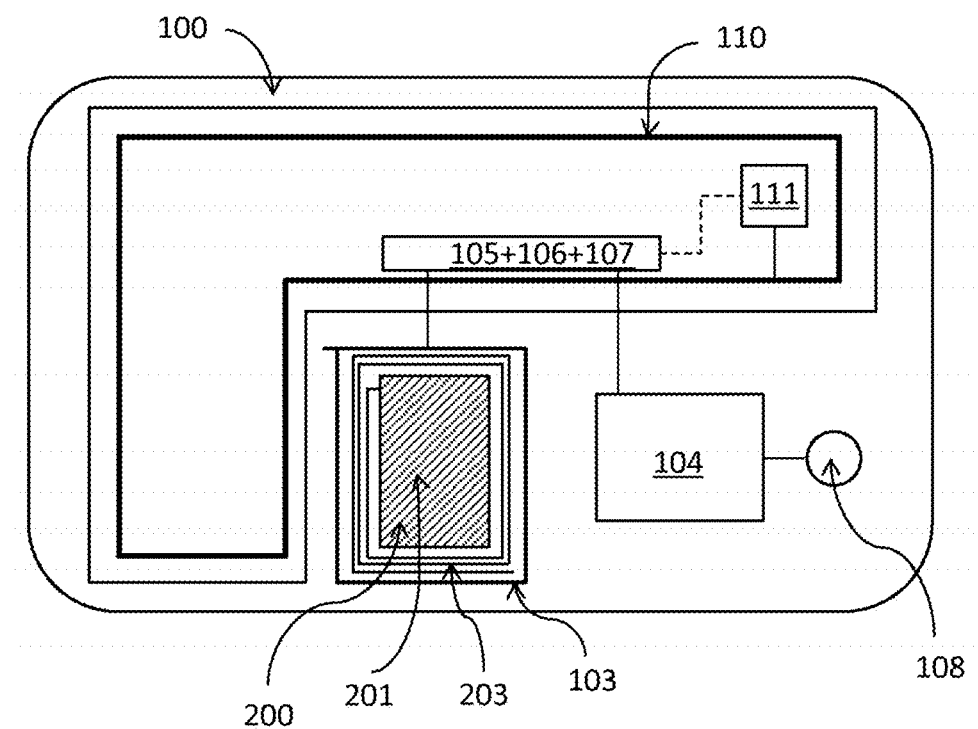

As an illustration, FIG. 7 schematically presents, in a plan view, an electronic entity according to an exemplary embodiment of the invention.

It is for example a chip card comprising a body 100, a module 200 and in particular a chip 111 in the body 100.

The chip 111 is linked on the one hand to an antenna 110 for communication with an external reader and on the other hand to a microcircuit 105, the antenna 110 for communication with an external reader and the microcircuit 105 being situated in the body 100.

In this exemplary embodiment, the electronic entity comprises a direct current source 104 and a switch 108 which controls the direct current source, also in the body 100.

For the sake of simplification, the microcircuit 105, an oscillator 106 and a demodulator 107 of the body 100 have been schematically represented jointly.

In particular, in this exemplary embodiment, the direct current source 104 is then arranged between the switch 108 and the oscillator 106.

The body 100 also comprises a first antenna 103 to which the oscillator 106 and the demodulator 107 are connected.

The first antenna 103 is coupled to a second antenna 203 belonging to the module 200.

Finally, the module 200 comprises an electronic component 201, which is linked to the second antenna 203 via a rectifier circuit that is not visible here.

If the electronic component 201 comprises a fingerprint sensor, the electronic entity is then, for example, a biometric card.

The invention claimed is:

1. An electronic entity comprising:
a body in which there is formed a cavity emerging on one face of the body, said face of the body forming a face of the entity;
a module inserted into this body by occupying said cavity;
a microcircuit forming part of the body;
a direct current source forming part of the body; and
an electronic component forming part of the module and accessible from the outside through said face of the entity, the electronic component being connected electrically to the microcircuit and having to be supplied with direct current by the direct current source,
wherein the body comprises a first antenna connected to the direct current source through an oscillator,
the module comprises a second antenna connected to the electronic component through a rectifier circuit, the first antenna and the second antenna being electromagnetically coupled, ensuring a wireless radiofrequency powering of the electronic component of the module by the direct current source of the body, and
the electromagnetically coupling of the first antenna and the second antenna ensuring the wireless radiofrequency powering of the electronic component of the module by the direct current source of the body and electrically connecting the electronic component to the microcircuit.

2. The electronic entity as claimed in claim 1, wherein the module further comprises a printed circuit connected both to the second antenna and to the electronic component by a plurality of terminals, the number of terminals greater than or equal to 4.

3. The electronic entity as claimed in claim 2, further comprising:
a modulator connected to one of the first antenna and the second antenna; and
a demodulator connected to the other of the first antenna and the second antenna,
the first antenna and the second antenna being thus configured to ensure a transmission of signals between the electronic component and the microcircuit.

4. The electronic entity as claimed in claim 2, wherein the direct current source is a battery.

5. The electronic entity as claimed in claim 1, further comprising:
a modulator connected to one of the first antenna and the second antenna; and
a demodulator connected to the other of the first antenna and the second antenna,
the first antenna and the second antenna being thus configured to ensure a transmission of signals between the electronic component and the microcircuit.

6. The electronic entity as claimed in claim 5, wherein the electronic component is a sensor generating signals for the microcircuit, the modulator being connected between the electronic component and the second antenna in the module and the demodulator is connected between the first antenna and the microcircuit in the body such that the first and second antennas ensure a transmission of said signals from the electronic component to the microcircuit.

7. The electronic entity as claimed in claim 6, wherein the electronic component is a fingerprint sensor.

8. The electronic entity as claimed in claim 7, wherein the module further comprises a parallel-serial converter between the electronic component and the second antenna configured to at least transmit signals in series.

9. The electronic entity as claimed in claim 6, wherein the module further comprises a parallel-serial converter between the electronic component and the second antenna configured to at least transmit signals in series.

10. The electronic entity as claimed in claim 1, wherein the direct current source is a battery.

11. The electronic entity as claimed in claim 1, wherein the direct current source is connected to the electronic component through a switch allowing a user of the electronic entity to connect the direct current source to the electronic component, or to disconnect it, at will.

12. The electronic entity as claimed in claim 11, wherein the switch is a pushbutton, depression of the pushbutton connecting the direct current source to the electronic component.

13. The electronic entity as claimed in claim 1, wherein the direct current source is connected to the electronic component through a switch controlled by a transducer configured to generate a current by conversion of an energy coming from outside from the user contacting the transducer, said transducer being borne by a second module inserted into a second cavity of the body, the second module comprising a second additional antenna powered by the transducer, the body comprising a first additional antenna connected to the switch, the first additional antenna being coupled electromagnetically to said second additional antenna.

14. The electronic entity as claimed in claim 1, wherein the direct current source is connected to the electronic component through a switch controlled by another antenna configured to connect the direct current source to the electronic component when the other antenna enters into a surrounding electromagnetic field.

15. The electronic entity as claimed in claim 1, wherein the direct current source comprises at least one photovoltaic cell.

16. The electronic entity as claimed in claim 1, wherein the body comprises an antenna connected to the microcircuit, said antenna being configured to allow the microcircuit to communicate with an external reader.

17. The electronic entity as claimed in claim 1, wherein the coupling between the first antenna and the second antenna is configured to transmit at least 90% of the power transmitted by the direct current source.

18. The electronic entity as claimed in claim 1, wherein the body is delimited by said face and an opposite face, which are both planar, a separation between the planar faces defining a thickness of the electronic entity.

19. A method for fabricating an electronic entity, the method comprising:
  forming a body containing a microcircuit, a direct current source, and a first antenna connected to the direct current source through an oscillator, the body comprising a cavity emerging on one face of the body, said face of the body forming a face of the entity, the cavity having a form and a volume of a module;
  forming the module containing an electronic component and a second antenna connected to the electronic component through a rectifier circuit; and
  inserting the module into the cavity of the body, the electronic component being accessible from the outside through said face of the entity, the first antenna and the second antenna being electromagnetically coupled, ensuring a wireless radiofrequency powering of the electronic component by the direct current source and electrically connecting the electronic component to the microcircuit,
  wherein the electromagnetically coupling of the first antenna and the second antenna ensuring the wireless radiofrequency powering of the electronic component of the module by the direct current source of the body and electrically connecting the electronic component to the microcircuit.

* * * * *